United States Patent [19]
Ponslet et al.

[11] Patent Number: 6,102,379
[45] Date of Patent: *Aug. 15, 2000

[54] TORSION SPRINGS WITH VISCO-ELASTIC DAMPING

[75] Inventors: Eric R. Ponslet; William O. Miller, both of Los Alamos, N. Mex.

[73] Assignee: Hytec, Inc., Los Alamos, N. Mex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,030

[22] Filed: Nov. 17, 1997

[51] Int. Cl.⁷ ........................................ F16M 1/00
[52] U.S. Cl. ................ 267/136; 208/154; 208/273; 208/279; 208/280; 208/281; 208/282
[58] Field of Search .................... 208/154, 273, 208/279, 280, 281, 282

[56] References Cited

U.S. PATENT DOCUMENTS

| | | | |
|---|---|---|---|
| 339,762 | 4/1886 | Goewey . | |
| 2,056,816 | 10/1936 | Zimmerli | 267/61 |
| 2,852,424 | 9/1958 | Reinhart et al. | 154/90 |
| 3,704,877 | 12/1972 | Nunes et al. | 267/166 |
| 3,730,509 | 5/1973 | Jorn | 267/152 |
| 3,744,782 | 7/1973 | Thomas et al. | 267/154 |
| 4,172,590 | 10/1979 | Jarret et al. | 267/149 |
| 4,278,726 | 7/1981 | Wieme | 428/229 |
| 4,422,627 | 12/1983 | Schmidt et al. | 267/148 |
| 4,593,889 | 6/1986 | Odobasic | 267/282 |
| 4,611,792 | 9/1986 | Jarret et al. | 267/149 |
| 4,640,500 | 2/1987 | Shiau | 267/168 |
| 4,659,069 | 4/1987 | Odobasic | 267/280 |
| 4,773,633 | 9/1988 | Hinz et al. | 267/148 |
| 4,836,516 | 6/1989 | Wycech | 267/279 |
| 4,932,637 | 6/1990 | Jarret | 267/148 |
| 4,942,075 | 7/1990 | Hartel et al. | 428/109 |
| 5,203,435 | 4/1993 | Dolgin | 267/154 |
| 5,358,210 | 10/1994 | Simon et al. | 248/628 |
| 5,405,668 | 4/1995 | Sandt | 428/36.9 |
| 5,576,081 | 11/1996 | Sandt | 428/36.9 |
| 5,667,204 | 9/1997 | Slocum | 267/154 |
| 5,951,503 | 6/1999 | Enright | 267/281 |

*Primary Examiner*—Matthew C. Graham

[57] ABSTRACT

A metal spring with embedded constrained layer damping provides effective damping of a supported load. A continuous load bearing tube is provided with an inner diameter and an outer diameter with a plurality of constraining layer tube sections concentric with the load bearing tube and spaced along the load bearing tube. A damping layer of a viscoelastic material contacts facing surfaces of the continuous load bearing tube and the constraining layer tube sections so that shear strains are induced in the viscoelastic material from relative rotation of the load bearing tube and the constraining layer sections to provide damping of an applied load. In one embodiment, the constraining layer tube sections and damping are within the load bearing continuous tube and the continuous tube is sealed at each end to permit use of the spring in a vacuum environment.

9 Claims, 5 Drawing Sheets

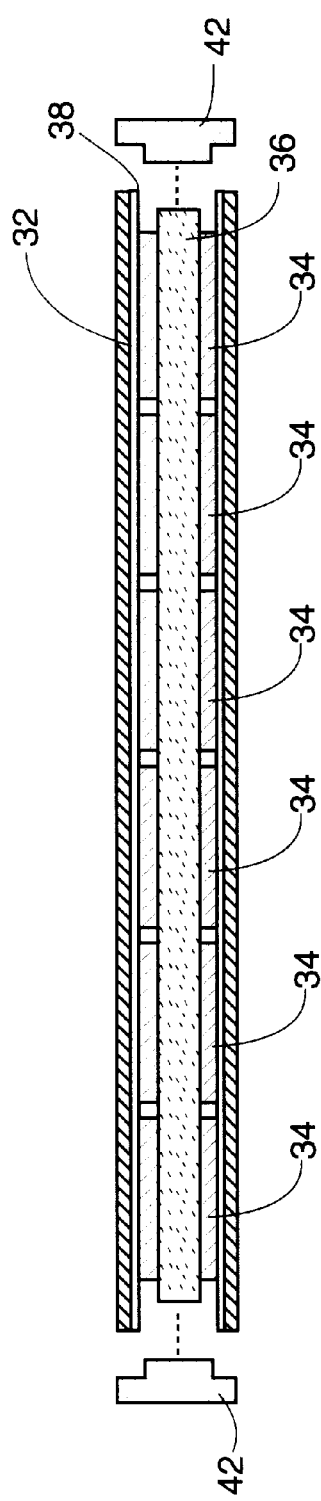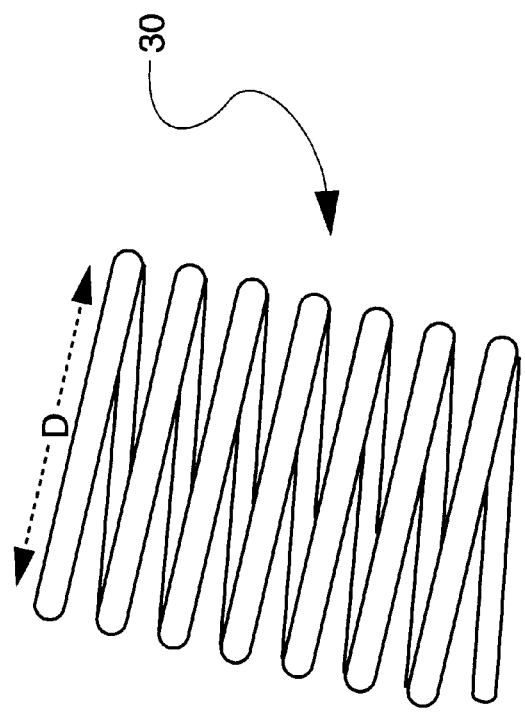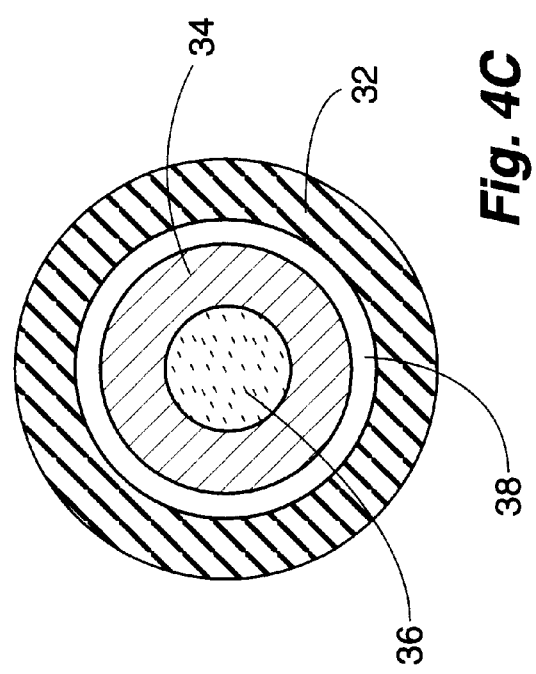

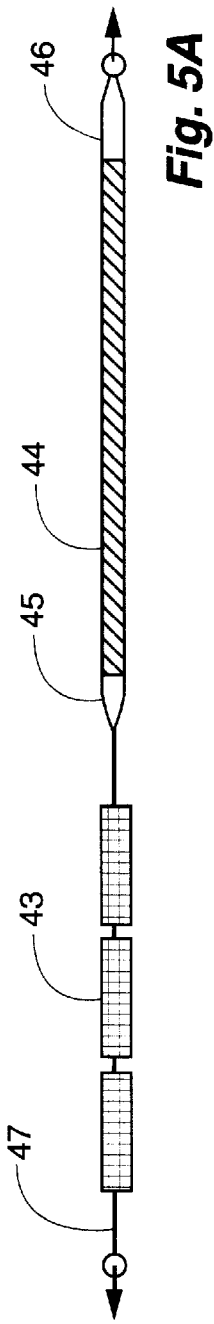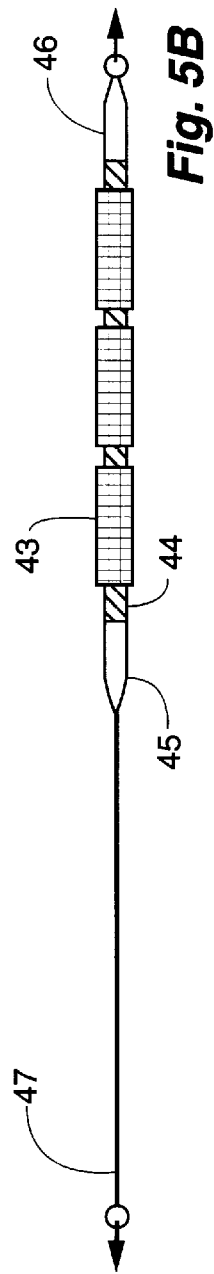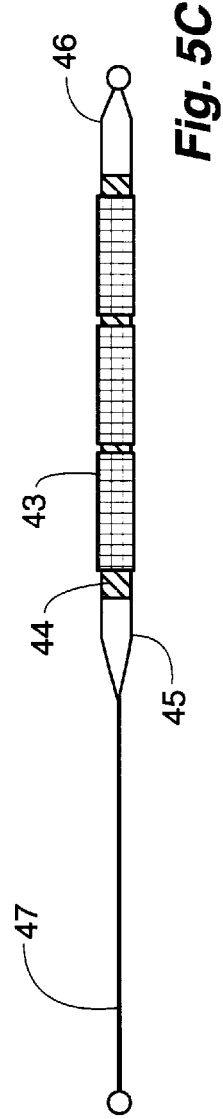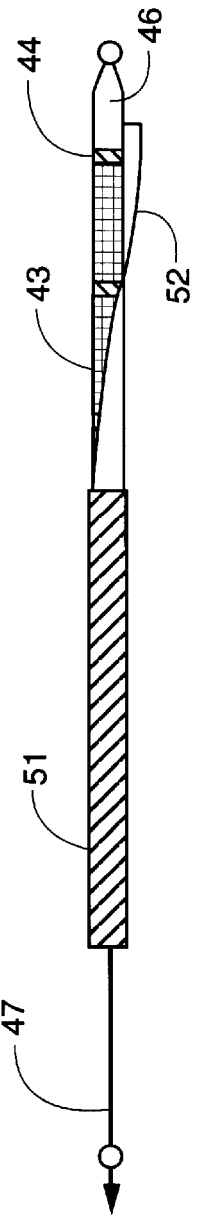

TORSION SPRINGS WITH VISCO-ELASTIC DAMPING

FIELD OF THE INVENTION

This invention was made with government support under a grant to the California Institute of Technology funded by the National Science Foundation. The Government has certain rights in the invention.

BACKGROUND OF THE INVENTION

Vibration isolation systems are used in a wide variety of applications to reduce transmission of mechanical vibrations generated by noisy components or carried by the environment to a sensitive device. Examples include isolation of optical benches from floor-borne seismic disturbances, isolation of a car or airplane body from engine vibrations, or suspension systems of vehicles.

Isolation is achieved by inserting soft mechanical links ("isolators") between the subsystem containing the source of the disturbances and the subsystem to be isolated. Based on the relative sizes of these subsystems, two classes of isolation systems can be distinguished.

In the first situation, the environment is isolated from vibrations created by a piece of machinery. A typical example is the isolation of a car body from vibrations caused by the engine, or isolation of a facility floor from vibrations induced by rotating machinery (compressors, presses, etc.). In the other, a sensitive device is protected from disturbances carried by its supporting structure. Isolation of an optical bench from floor borne vibrations is a common example.

In both cases, the effectiveness of the isolation system can be examined in terms of transmissibility functions, T, in the frequency domain. In the first class of systems, these transmissibilities can be expressed as ratios of excitation forces to forces transmitted to the floor. In the second class, they are usually expressed as ratios of component of floor motion to component of device motion. Mixed formulations are also possible. Whatever exact definition is used for T, its magnitude typically can be represented by a graph with three regions. At "low" frequencies, resonant peaks corresponding to the suspension modes are observed. There is no isolation in this band (in fact there is amplification). At the "high" end of the spectrum, flexible modes of the device and/or supporting structure themselves produce other resonant peaks. In a properly designed isolation system, those two frequency ranges are separated by a wide "isolation band" where transmission decays rapidly with frequency f (about −40 dB/decade for a lightly damped, single stage system). A properly designed system will "see" most of the disturbance energy occur in this band.

In the isolation band, the transmissibility is a direct function of the "softness" of the isolator mounts. This "softness" can be expressed by a characteristic deflection parameter $\delta_{max}$. For usual applications, where the isolators also support the weight of the device, $\delta_{max}$ is defined as $$\delta_{max}(f) = \frac{P_{max}}{|k(f)|},$$

where $P_{max}$ is the maximum static load that can be supported by the isolator and k is the stiffness of the isolator. Note that k may be a frequency-dependent quantity (as is the case with rubber isolators for example).

At lower frequencies however, resonances of the suspension dominate the transmissibility. To properly dampen the response to transients and to limit the amplitude of the response to disturbances at the resonance frequencies, isolation systems must also provide some damping. That damping is usually expressed in terms of the quality factor (Q) of a resonant mode. The Q defines the dynamic amplification at resonance (ratio of dynamic to static response) and is equal to $$Q(f) = \frac{1}{\eta} = \frac{1}{2\zeta},$$

where $\eta$ is the loss factor and $\zeta$ is the critical damping ratio of the mode considered. The Q's of the suspension are directly controlled by the loss factors of the isolators. Examples of high loss isolators include rubber supports or spring/damper combinations. Note also that viscous damping (dashpots in vehicle suspensions for example) is less than ideal in isolation applications because of the stiffening effect at high frequencies, which leads to loss of isolation performance. Viscoelastic damping is in general preferable because of lesser stiffening.

In short, soft mounts for high performance isolation systems must have the following characteristics: large characteristic deflections in the isolation range (typically above 1 to 15 Hz), and high loss in the resonance region (typically below 1 to 15 Hz). Other desirable characteristics are compactness and simplicity, low drift, good aging characteristics in a variety of environments, and low outgassing potential for high vacuum applications.

The present invention consists of a novel way of combining the desired spring and damping effects into a single, self-contained isolator. A metal spring (coil or torsion rod), has embedded viscoelastic damping treatments. The load carrying metal element offers advantages of potentially very large characteristic deflection $\delta_{max}$ and negligible drift or aging. This contrasts with rubber isolators which have relatively poor characteristic deflections (i.e. they are relatively stiff for a given load capacity), considerable long term drift, and aging problems. The inclusion of self-contained damping treatments provides the required damping at low frequency with a much simpler system than combinations of separate spring and damper units. The concept also allows for a continuous, sealed metal envelope that traps outgassing materials for use in high vacuum systems.

Damping is obtained through a novel application of the well known constrained layer damping (CLD) technique where a thin layer of viscoelastic material is sandwiched between two layers of structural material in such a way that deformations in the structure induced large shear strains in the damping layer. The novelty consists of the application of CLD to the damping of torsional deformations of a wire-like structure. The torsional deformations result from direct torsional loading (as in the case of a torsion rod) or occur in response to traction or compression loading of coil springs.

Accordingly, it is an object of the present invention to provide metal springs and torsion rods with damping characteristics from embedded constrained layer viscoelastic damping treatments that are suitable for transient and low frequency responses in isolation systems, while providing the large characteristic deflections required for isolation effectiveness.

Another object of the present invention is to provide springs with entirely sealed damping treatments as required for use in high vacuum systems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a metal spring using constrained layer damping. A continuous load bearing cylindrical structure is provided with a plurality of constraining layer cylindrical sections concentric with the load bearing tube and spaced along the load bearing cylindrical structure. A damping layer of a viscoelastic material contacts facing surfaces of the continuous load bearing cylindrical structure and the constraining layer cylindrical sections so that shear strains are induced in the viscoelastic material from relative rotation of the load bearing tube and the constraining layer sections to provide damping of an applied load. In one embodiment, the constraining layer cylindrical structure sections and damping layers are within the load bearing continuous tube and the continuous structure is sealed at each end to permit use of the spring in a vacuum environment.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 4A, 4B & 4C illustrate a preferred embodiment for a metal coil spring.

FIGS. 5A, 5B, 5C & 5D depict a process for assembling a spring according to one embodiment of the present invention.

DETAILED DESCRIPTION

Figure 1A:
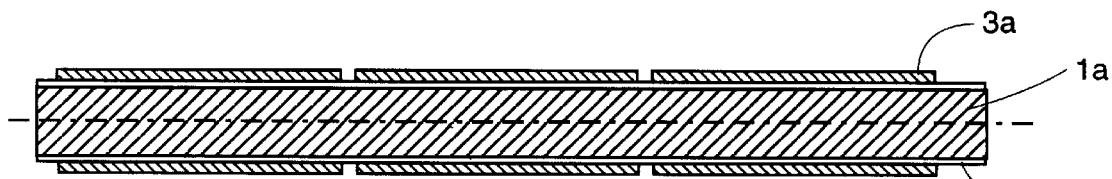
FIGS. 1A, 1B, 1C, 1D & 1E are cross-sections of springs with torsional damping according to various embodiments of the present invention using constrained layer damping.
Figure 1B:
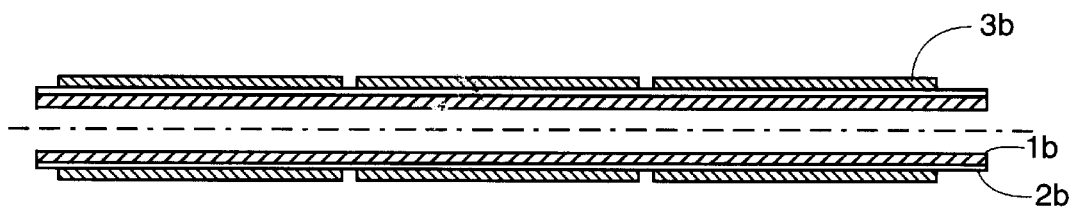
Figure 1C:
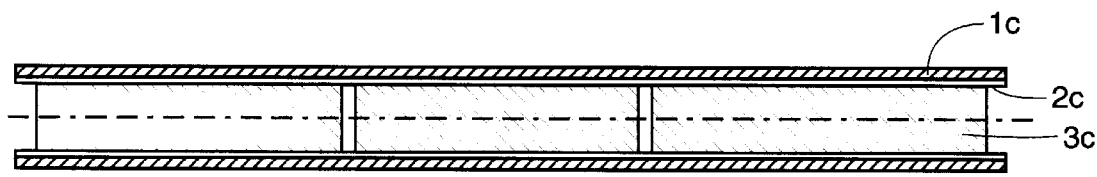
Figure 1D:
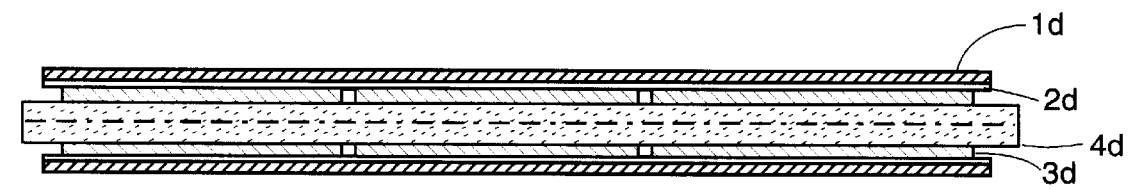
Figure 1E:
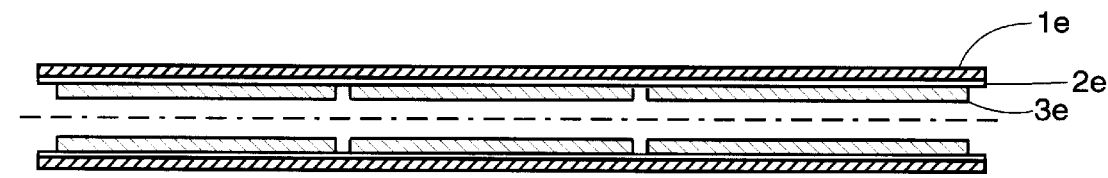

The following symbols are used herein to identify mechanical characteristics and parameters relating to the present invention; the numbers refer to the components shown in FIGS. 1A–1E:

| | |
|---|---|
| $J_w$ | Torsional moment of inertia of load bearing structure (1a–e) |
| $G_w$ | Shear modulus of load bearing material (1a–e) |
| $T_w$ | Torsional moment in load bearing structure (1a–e) |
| $d_v$ | Mean diameter of damping layer (2a–e) |
| $t_v \ll d_v$ | Thickness of damping layer (2a–e) |
| $G_v = G_v'(1 + i\eta_v)$ | Complex shear modulus of damping material (2a–e, usually frequency dependent) |
| $G_v'(f)$ | Shear storage modulus of damping material (2, usually frequency dependent) |
| $\eta_v(f)$ | Loss factor of damping material (2a–e, usually frequency dependent) |
| $\gamma_v$ | shear strain in damping layer "through the thickness" |
| $l_c$ | Length of constraining layer section (3a–e) |
| $J_c$ | Torsional moment of inertia of constraining structure (3a–e) |
| $G_c$ | Shear modulus of constraining material (3a–e) |
| $T_c$ | Torsional moment in constraining structure (3a–e) |
| f | Frequency |
| $k_t$ | Torsional stiffness of torsion rod or coil spring (complex number) |
| $\eta$ | Loss factor of torsion rod or coil spring |
| Re | Operator, real part of a complex number |
| Im | Operator, imaginary part of a complex number |

In accordance with the present invention, metal springs are provided with embedded damping treatments for transient and low frequency response to torsional loads while retaining characteristic deflections large enough to satisfy isolation requirements. As used herein, the term "spring" includes coil springs and torsion rods. Helical coil springs offer very large static deflection capacity relative to their size. This is due to the uniform torsional loading of the spring wire along its length and the lever arm effect from the coil radius.

The simplest conceptual design of a damped coil spring is described in U.S. Pat. No. 4,640,500, issued Feb. 3, 1987, to Shiau. A coiled compression spring is formed from a metallic tubular cross section member that is filled with a high damping viscoelastic material. However, it can be shown that this simple filled tube can provide only very small net damping in the spring for small, elastic deformations. This is due to the relatively low modulus of currently available high loss materials and the fact that the outer tube must carry the largest portion of the applied load to avoid large, unlimited creep.

To achieve larger loss factors using existing viscoelastic materials, damped coil springs/torsion rods are based on a novel application of the well known Constrained Layer Damping (CLD) technique. CLD consists of sandwiching a thin layer of high damping viscoelastic material between two stiffer materials. Depending on the application, both layers of stiffer materials may be load bearing, or one may be load bearing while the other may be primarily a constraining layer. Small deflections of the load bearing structure induce relatively large motions between that structure and the constraining layer, which in turn cause large shear strains in the thin viscoelastic layer. Those shear strains in the viscoelastic layer lead to significant losses of mechanical energy into heat, which provides damping of dynamic deflections in the spring.

Plunkett et al., "Length Optimization for Constrained Viscoelastic Layer Damping," 48 J. Acoust. Soc. Amer., No. 1, pp. 150–161 (1970) describe constrained viscoelastic-layer damping for engineering structures such as beams, columns, and plates. An optimum length constraining layer is created by cutting the constraining layer at regular intervals. The constraining layers described therein are subjected to tension and compression only and there is no suggestion for an application to structures that are loaded in torsion.

In accordance with the present invention, the CLD technique is adapted to provide damping of a torsion bar or coil spring in the following manner (refer to FIGS. 1A–1E):

1. The load bearing structure 1a–e is in the form of a continuous tube or rod having an outer diameter and an inner diameter (if a tube), where the tube or rod is either substantially straight to act as a torsion rod, or coiled to act as a coil spring.

2. The damping layer 2c–e is either trapped inside the load bearing tube 1c–e, or layer 2a–b is wrapped around the load bearing rod or tube 1a–b. It is sandwiched between that load bearing tube or rod 1a–e and a constraining layer 3a–e.

3. The constraining layer 3a–e is in the form of a lengthwise distribution of torsionally stiff sections of rod or tube and is concentric with the load bearing structure 1a–e. The constraining layer 3c–e is arranged inside the inner diameter of the load bearing tube 1c–e and damping layer 2c–e or the constraining layer 3a–b is arranged outside the outer diameter of the load bearing tube or rod 1a–b and damping layer 2a–b. In the case of a coil spring application of the invention, the length of each constraining section 3a–e is significantly less than the developed length of a full turn of the coil. This last condition is necessary to prevent loss of damping from coupling between the load bearing 1a–e structure and the constraining layer 3a–e through normal stresses in the damping layer 2a–e instead of the desired shear stresses.

Such coupling would not occur in a straight torsion rod, allowing the use of a continuous constraining layer. However, even in that case, a sectioned constraining layer 3a–e will usually provide better damping than a continuous one. The optimal choice of a particular section length $l_c$ is dictated by the materials and proportions of the cross sections, and the frequency range where maximum damping is desired, as discussed below. In a coil, however, the use of a continuous length of constraining layer would create a spring inside a spring, eliminating any relative motion therebetween and any chance for damping from shear in the viscoelastic layer. In the spring described in U.S. Pat. No. 4,640,500, such damping would not occur because of the above mentioned coupling and any damping observed in such spring is due only to secondary local effects at the end of the outside tubular spring where relative twist will occur only locally due to a difference in torsional stiffness between the outside and inside spring.

4. The application of a twisting moment to the load bearing structure 1a–e (in the case of a coil spring, the application of an axial compression or traction load leads to a uniform twisting moment in the spring "wire") causes twist in that structure. The constraining layer 3a–e, on the other hand is not directly loaded and tends to remain essentially undeformed. This leads to relative twist between the load bearing structure 1a–e and the constraining structures 3a–e, and causes relatively large shear strains in the thin damping layer 2a–e. This shear, in turn, causes partial twisting moment transfer into the constraining structure 3a–e, which results in twist in that structure, but of lesser amplitude compared to the twist in the load bearing structure 1a–e.

Figure 2A:
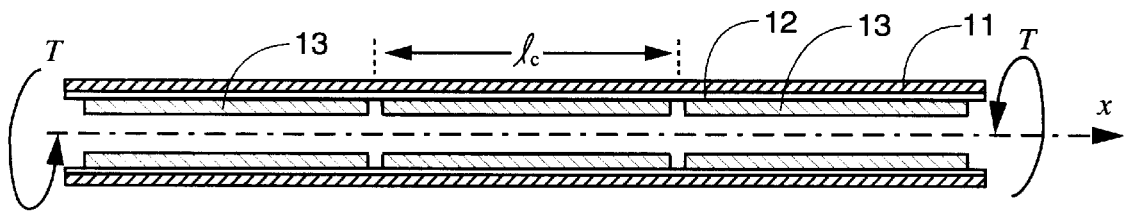
FIGS. 2A, 2B, 2C & 2D graphically depict twisting moment and shear strain distributions along the length of an exemplary embodiment of a constrained layer damped spring.
Figure 2B:
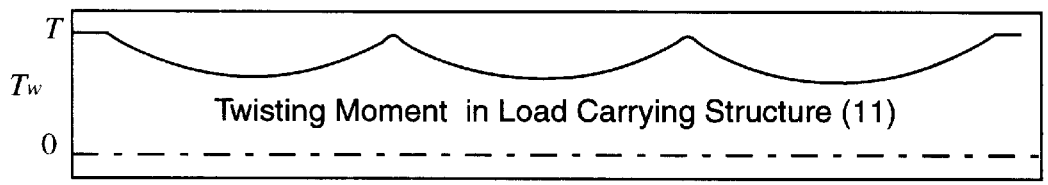
Figure 2C:
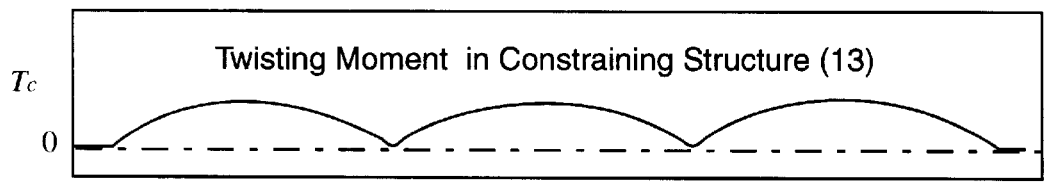
Figure 2D:
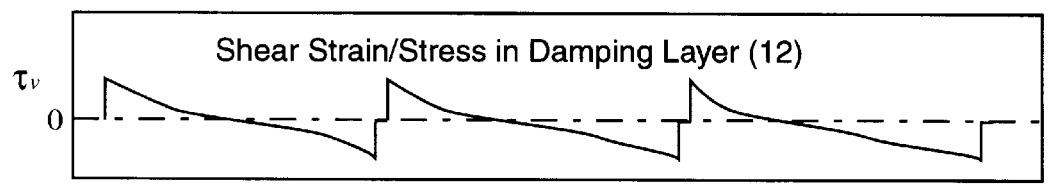

FIGS. 2A–D illustrate these phenomena with an exemplary structure (FIG. 1E) shown at FIG. 2A. The load bearing structure 11 is loaded by a twisting moment T. The length $l_c$ of the constraining layer sections 13 is also shown in FIG. 2A. FIGS. 2B–2D shows diagrams of distributions of the twisting moment $T_w$ in the load bearing structure 11, the twisting moment $T_c$ in the constraining layer sections 13, and the shear strain $y_v$ in the damping layer 12. Note that, with the assumption that the magnitude of the shear modulus of the damping layer $G_v(f)=G_v'(f)(1+i\eta_v(f))$ (complex number, function of frequency) is substantially smaller than that of both the load bearing structure 11 ($G_w$) and the constraining layers 13 ($G_c$), i.e., $|G_v(f)| \ll G_w, G_c$, then $$T = \text{constant} = T_w(x) + T_c(x).$$

In the case of a coil spring, neglecting the coupling effect mentioned in item 3, above, the net loss factor $\eta_v$ caused by shear in the viscoelastic layer can be evaluated as for a straight torsion rod using classical equilibrium and elasticity relations and is found equal to $$\eta_v = \frac{\text{Im}(k_t)}{\text{Re}(k_t)},$$

where $$k_t = \frac{G_w J_w + G_c J_c}{1 + \frac{2}{\lambda l_c} \frac{G_c J_c}{G_w J_w} \tanh\left(\frac{\lambda l_c}{2}\right)},$$

is the torsional stiffness of the rod or spring "wire", and $$\lambda = \sqrt{G_v'(1+i\eta_v) \frac{\pi d_v^3}{4t_v} \frac{G_w J_w + G_w J_w}{G_w J_w G_c J_c}}.$$

FIGS. 3A–3D illustrate the effects of various design parameters on the net loss factor in the torsion rod or coil spring. The trend study is performed around a "nominal" design of the type shown in FIG. 2A, i.e., the dotted lines and bullets in FIGS. 3A–3D identify that "nominal" design. The four curves in the figures show the individual effects of four parameters on the torsional damping: the length $l_c$ of the constraining sections 13 (FIG. 3A); the torsional stiffness balance $G_c J_c | G_w J_w$ between the constraining 13 and load carrying 11 cross sections (FIG. 3B); the loss factor $\eta_v$ of the viscoelastic layer 12; and a measure $d_v^3 G_v/t_v$ of the stiffness of the viscoelastic layer 12 in differential twist, normalized to its value in the "nominal" design $(d_v^3 G_v/t_v)_{nom}$. The following observations can be made:

1. Damping is very sensitive to $l_c$. Physically this is explained as follows: when $l_c$ is large, load transfer to the constraining sections 13 accumulates along their length and forces them to twist, reducing the twist angle differential and the damping. If the sections are short, the twist angle differential at their ends is small and damping is again small. An optimal length exists that maximizes damping. Note that this optimal length also depends on the values of the other three parameters.

Figure 3B:
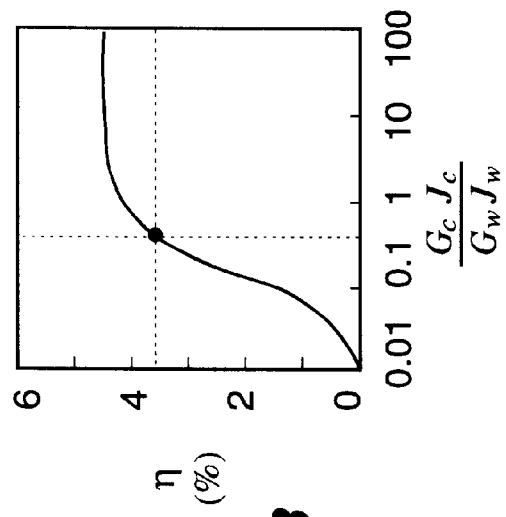
FIGS. 3A, 3B, 3C & 3D graphically depict typical effects of various cross-section parameters on net torsional loss factor for the spring shown in FIG. 2A.
Figure 3D:
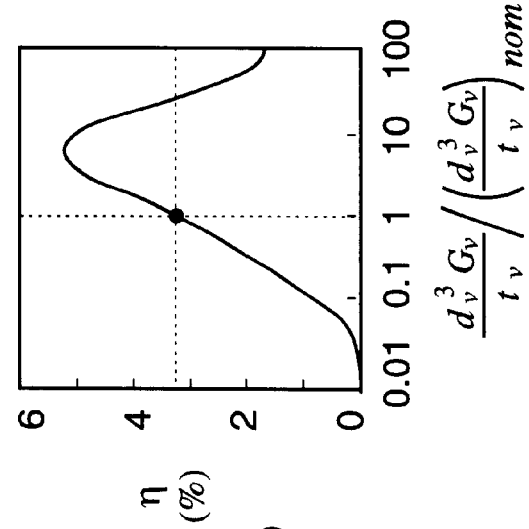
Figure 3A:
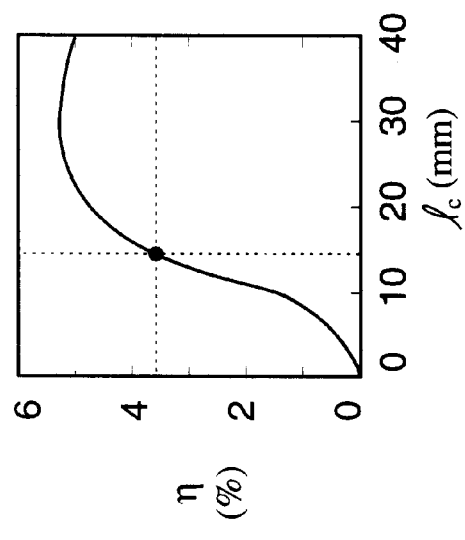

2. The torsional stiffness of the constraining structure must be large enough to minimize its twist. FIG. 3B shows that values of $G_c J_c/G_w J_w$ greater than about 1 are best and that, above 1, the effect of this parameter is small.

Figure 3C:
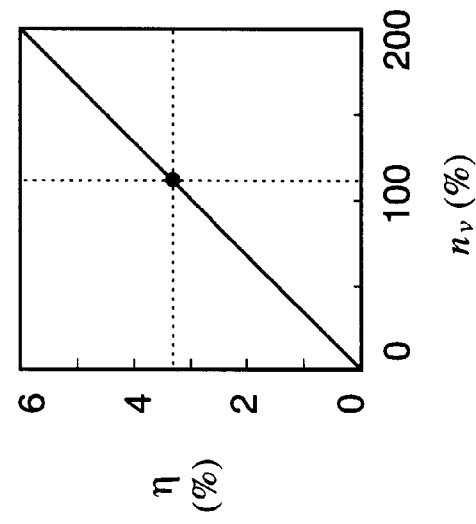

3. As expected, an increase in the loss factor $\eta_v$ of the viscoelastic layer leads to an almost proportional increase in net spring loss factor (FIG. 3C).

4. The effect of the viscoelastic layer "stiffness" $d_v^3 G_v/t_v$ (FIG. 3D) also shows the existence of an optimal value. This is again explained by a balance condition between a stiff layer that induces too much twist in the constraining structure 13, reducing shear strains and damping, and a soft layer 12 that minimizes twist of the inner sections but reduces the elastic energy in the damping layer because of its low modulus and/or large thickness.

Referring now to FIGS. 4A–C, the preferred embodiment of this invention is a coil spring 30 formed from a tubular load carrying tube 32 with damping treatments 34, 38 on the inside. The material used for the load carrying tube 32 should be selected for its elastic and cold forming properties. The maximum static shear stress $\tau_w$ in the load carrying structure 1a–e (FIGS. 1A–E) of a coil of mean diameter D and with a load bearing tube or rod having a torsional moment of inertia $I_w$ and outer diameter $d_w$ is approximately given by $$\tau_w = \frac{Dd_w P}{2I_w},$$

where P is the applied load. Accepted design practices for cold formed springs would then require selecting for the load bearing tube or rod a material with a tensile strength $\sigma_{tensile}$ such that $$\sigma_{tensile} \geq 3 \times \tau_w.$$

In addition to high yield strength, the chosen material must be able to sustain the strains imposed on it during the coiling operation. Coiling strains $\epsilon_{coil}$ are between $d_w/D$ and $2\, d_w/D$ depending on the coiling technique. An adequate material should therefore also have an ultimate elongation $\epsilon_{ult} \geq \alpha \epsilon_{coiling}$, where $\alpha$ is a safety factor, typically 1.5 to 3.

An exemplary material is phosphorous bronze, which is available in various mill tempers obtained by cold working for a variety of coil designs. To define an appropriate amount of cold work, a compromise must be found between the yield strength and cold forming properties. A hard temper (more cold work) gives a higher yield strength and load carrying capacity for the spring, but makes cold forming (coiling the spring more particular) more difficult. Note that hot forming will normally not be an option because of the presence of the temperature sensitive damping layer. Also, numerous materials otherwise appropriate for cold formed springs require a post-forming bake to partially relieve forming stresses and this limits the choice depending on the temperature capability of the damping layer. With high-loss viscoelastic materials, a bake is typically not an option, restricting the choices to those materials for which stress-relief is not required. Note also that age hardening materials, like Beryllium copper, K-Monel, Inconel-X, or some stainless steels would typically not be usable because of the long, high temperature aging process required after forming. With these considerations in mind, other suitable material with high yield and good cold forming properties are, for example, spring brass, nickel silver, silicon bronze, and Monel.

The damping layer 38 is a sheet of viscoelastic material, wrapped on the inside of the load carrying tube 32. The damping material 38 selection is based primarily on the values of the loss factor $\eta_v$ and the loss modulus $G_v''=\eta_v G_v'$; a large loss modulus (i.e. stiff material with high loss factor) gives better potential for high torsional damping. Another important selection criterion is the sheet thickness available from a manufacturer: thin damping layers give higher shear strains and, therefore, higher damping. Note, however, that very thin damping sheets may be impractical from a manufacturing standpoint. A suitable material is DYAD 606, manufactured by Soundcoat, which is available in 20 and 50 mil thicknesses, has a very high loss factor (1.05 at 10 Hz) and relatively large shear storage modulus $G_v'$ (22 Mpa at 10 Hz and room temperature) and is pliable enough for wrapping around the constraining tube sections 34. The loss modulus $G_v''$ of Dyad 606 is about 22 Mpa at room temperature.

Other viscoelastic materials can, of course, be considered. However, very high loss materials with sufficiently high loss modulus are not many. Two examples of suitable materials that have been considered are: high loss fluoro-elastomers ($G''$~15 MPa) or other rubbers and Isodamp VC-1100® ($G''$~15 MPa) from E.A.R. Specialty Composites.

Note also that a widely used constrained layer damping sheet from 3M Corporation (SCOTCHDAMP®) was not appropriate for this application because of a low loss modulus ($G''$~0.2 MPa). Further, the material comes in extremely thin and soft sheet material that is not suitable for the manufacturing processes described herein.

Constraining sections 34 are lengths of tubes trapped inside the outer tube and viscoelastic damping layer. A material property of particular importance for the constraining layer 34 is the shear modulus $G_c$, which should be of the same order of magnitude as that of the outside tube $G_w$. More particularly, the torsional stiffness $G_c J_c$ of the constraining layer must be at least equal to that of the load bearing tube/rod $G_w J_w$ as shown in FIG. 3B. Further, for coil springs, the yield strength should be low to facilitate forming during the coiling operation but high enough to sustain the twisting moment $T_c$ transferred from the outside tube 32 through the damping layer 38.

An exemplary material is a soft aluminum alloy. Other appropriate materials include various metals and alloys, typically in their annealed state for low yield strains ("pure" aluminum, soft copper, annealed brass, and the like). In some applications, plastic materials may also be appropriate (ABS, for example). Note also that, in the case of straight torsion rods, the constraining layer material can be essentially any material as long it is stiff and thick enough to make $G_c J_c > G_w J_w$ and sustain the transmitted twisting moment without yielding.

Finally, to facilitate assembly, a continuous length of a soft rubber core 36 fills the inside of the constraining tubes 34. This material is used only to facilitate assembly of the spring and has no structural function, although it happens to provide a small amount of additional damping.

The coil 30 is fabricated by first producing a straight length of the composite multi-layer tube, then coiling it to form a spring 30. After coiling, the ends of the outer tube 32 may be sealed by caps 42. In general applications, a sealed envelope may be required to protect the materials inside the coil from exposure to solvents, corrosive environments, etc. In vacuum applications, the caps 42 provide a continuous metal envelope that can be cleaned to vacuum standards and that traps outgassing materials from the damping sheet, rubber core, or adhesives.

Manufacturing of the coil spring involves 4 or 5 primary steps, as shown in FIGS. 5A–5D:
1. Preparation of sectioned constraining layer core (FIGS. 5A–5C;
2. Insertion of sectioned constraining layer core, damping sheet, and optional adhesive into a straight outer tube (FIG. 5D);
3. Cross-section reduction of the outer tube;
4. Coiling;
5. Sealing (optional).

In the case where an adhesive is used, and depending on the type and mechanical properties of the adhesive, steps 2, 3, and 4 may have to be completed in a rapid sequence to guarantee completion of the coiling operation 4 before hardening of the adhesive.

To prepare the sectioned constraining layer of step 1, the sections of constraining layer 43 are mechanically tied together to form a continuous length of "core" long enough to fill a length of outside tube 51 (FIG. 5D) required to manufacture a single coil, and strong enough to be pulled (or pushed) into the tube 51 together with the damping material 52 (FIG. 5D) and any adhesive (see step 2). If spacers (not shown) are used to separate the sections 43, the spacers must be soft enough to allow relative twisting motion between the ends of those sections 43 (for a typical spacing of the order of 1/20 of a section length, the shear modulus of the spacer material should be at least 200 times smaller than the shear modulus of the constraining layer material).

In a preferred technique, constraining sections 43 are provided with a strong interference fit on a rubber core 44, which may be a cord or tube, as shown in FIGS. 5A–5C. A length of rubber core 44 ("rubber" can be any elastic material much softer than the constraining layer material, soft enough to be stretched 20 to 50% under moderate load, with an OD slightly larger than the ID of tubes used as the constraining layer 43, is mechanically stretched to reduce its diameter to slightly less than the ID of those tubes 43. The tubes 43 are loaded on the stretched rubber core 44 and the appropriate spacing is set. The stretch is then released, causing the rubber core OD to expand and creating an interference fit between the rubber core 44 and the tubes 43. The final spacing between tube sections 43 is a function of initial spacing on the stretched rubber, the amount of stretch, and the elastic properties of the rubber.

More specifically, the assembly starts with a length of rubber core 44 to which a holding device 45, 46 is attached at each end, either through mechanical swaging on a tapered end, vulcanizing of a tapered end to a metal holding device, or other technique. The goal is to provide attachments 45, 46 to the rubber core 44 strong enough to sustain the traction load required for stretching but with a small enough OD that it can pass through the ID of the constraining layer tubes 43. A metal rod/wire 47 at least as long as the unstretched rubber is attached to one of the attachments 45 and a sufficient number of tube sections 43 are loaded on that rod. This assembly is then set in a stretching fixture that grabs the end of the pulling rod/wire 47 and the end 46 of the rubber core 44 and pulls on ends 46, 47 to stretch the rubber a known and repeatable amount (FIG. 5A). As the assembly is under stretch, the tube sections 43 are transferred from the rod/wire 47 to the rubber core 44 (FIG. 5B), and spaced using an appropriate indexing tool. The stretch is then released, causing the OD of rubber core 44 to expand, creating a strong interference fit with constraint tubes 43 that holds tube 43 in place (FIG. 5C).

One variation of this technique uses compressed air and a thick walled rubber tube for rubber core 44. The assembly sequence is identical to the above sequence except that compressed air is fed into the tube through an end clamp to hold constraining tubes 43 in place until completion of step 3, above. Once the stretch has been released, the compressed air supply is removed and the tubes are then held in place by interference fit only.

In an optional process, constraining tube sections 43 are placed in an injection mold with the appropriate spacing between adjacent tubes. A rubber compound is injected into the mold, filling the inside of the tubes and the gaps between adjacent tubes. After the rubber is cured, the resulting core is a continuous length of rubber with embedded tube sections. A pulling wire/rod 47 is attached at one end of the assembly for use in placing the assembly within the outside tube 51 (FIG. 6).

In yet another optional process, a length of rubber core (44), which may be a rod or a tube, is provided with an OD very slightly larger than the ID of constraining layer tubes 43. The diameter of rubber core 44 is selected to provide an interference with tubes 43 light enough that the tubes can be slid on core 44 manually. The assembly consists of alternately pulling a tube 43 and a rubber spacer (e.g., a rubber O-ring, not shown) onto core 44 until a length of core assembly sufficient for a single coil has been made. As above, some form of attachment if then provided on at least one end of core 44 for pulling the assembly into outside tube 51.

A damping material 52 and adhesive are then inserted into outer tube 51 together with the assembled rubber cord 44 and constraining tubes 43. Pulling rod 47 is still attached to one end of rubber core 44 and is longer than outside tube 51 so that is can be inserted into one end of tube 51 and grabbed from the other end before actual assembly begins. One end of a precut sheet of damping material 52 is wrapped around cord 44 close to the end that is attached to pulling rod/wire 47 and tied, clamped, glued, or otherwise held in place. This assembly is then pulled slowly into the outside tube 51 by the pulling rod/wire 47. Damping sheet 52 wraps itself around the core 43, 44 and into tube 51 at the entrance of tube 51. Depending on the type of damping material used, this wrapping may be helped with external devices such as sets of rollers, sliding dies, etc. In the case where an adhesive is used between the damping sheet 52 and the core 43, 44 and/or outside tube 51, that adhesive is spread inside tube 51 and/or on the core 43, 44 and/or on one or both sides of damping sheet 52 before or during this pulling operation.

The cross-section of outer tube 51 is then reduced to form the required interference fit and/or eliminate excess adhesive. This step consists of processing the straight section of the composite tube so as to reduce the inside diameter of outside tube 51 and eliminate the clearance required for the pulling operation above. In the case where an adhesive is used, this diameter reduction also eliminates some of the excess adhesive in the assembly. When no adhesive is used, this operation provides the required compressive preload at damping layer 52 to outside tube 51 and constraining layer 43 interfaces to prevent slippage. The diameter reduction can also be obtained by swaging, redrawing, or any other process. Rotary swaging is the preferred technique. The end result is a straight piece of composite tube with the core and damping materials tightly trapped inside outer tube 51.

A coil spring is formed by coiling the straight piece of composite tube formed above. Coiling is done by any technique including mandrel and driver techniques, CNC coiling machines, continuous roller coiling techniques, etc. Coiling tools must be designed to minimize distortion of the tube cross section; in particular, significant out-of-round in the coil cross section would be expected to partially lock the relative twist effect and reduce damping. The end result is a "coil" with any number of turns, usually requiring trimming of the ends to obtain the specified number of turns and eliminate the ends which are often not adequately coiled or may be damaged during the coiling operation.

In one embodiment of the present invention, the ends of outer tube 51 are sealed, creating a protective outer envelope. Sealing can be performed in a number of ways such a swaging, crimping, welding, gluing/potting the ends of the coil for example. The preferred embodiment for a vacuum compatible spring uses a small solid cylindrical cap (see, e.g., caps 42 of FIG. 4B) made of a material compatible with (usually identical to) the outer tube. The ends of the tube are machined and cleaned after coiling to provide a recess where the cap is inserted (with a close-to-tight fit). The cap is then welded to the tube to provide a leak tight joint. Welding can be performed using any technology compatible with the intended use of the spring. The preferred technique is electron-beam welding which provides clean, deep welds appropriate for vacuum applications.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A metal spring comprising:
   a continuous load bearing cylindrical structure that undergoes torsional deformation under an applied torsional load;
   a plurality of constraining layer cylindrical sections that are not directly torsional loaded and remain relatively undeformed as the continuous cylindrical structure is torsionally loaded, and are concentric with the load bearing structure and spaced along the load bearing structure; and
   a damping layer of a viscoelastic material contacting facing surfaces of the continuous load bearing structure and the constraining layer cylindrical sections so that shear strains are induced in the viscoelastic material from the relative torsional rotation of the load bearing tube and the relatively undeformed movement of the constraining layer sections to provide damping of an applied load.

2. A metal spring according to claim 1, wherein the load bearing cylindrical structure is a tube having an inner diameter and an outer diameter and the constraining layer cylindrical sections are within the inner diameter of the load bearing tube.

3. A metal spring according to claim 1, wherein the constraining layer cylindrical sections are cylindrical tube sections having an inner diameter and an outer diameter and the load bearing cylindrical structure is within the inner diameter of the constraining layer tube sections.

4. A metal spring according to claim 1, wherein the metal spring is a coil spring and each constraining layer cylindrical section has a length that is less than the length of a full turn of a coil of the coil spring.

5. A metal spring according to claim 4, wherein the load bearing cylindrical structure is a cylindrical tube have an inner diameter and an outer diameter and the constraining layer cylindrical sections are within the inner diameter of the load bearing tube.

6. A metal spring according to claim 4, wherein the constraining layer tube sections are formed from a metal having a shear modulus of the same order of magnitude as the shear modulus of the continuous load bearing tube and a yield strength that is low enough to facilitate forming when the coil spring is formed but high enough to sustain twisting motion transferred from the load bearing tube through the damping layer.

7. A metal spring according to claim 6, wherein the damping layer is formed from a viscoelastic material having a large loss factor and a large loss modulus.

8. A metal spring according to claim 3, further including a core of soft rubber having an outer diameter when the core is relaxed that forms an interference fit with the constraining layer tube sections to hold the tube sections in a spaced relationship.

9. A metal spring according to claim 3, where ends of the continuous load bearing tube are sealed to permit use with the damping layer in a vacuum environment.

* * * * *